United States Patent Office 3,115,443
Patented Dec. 24, 1963

3,115,443
PROCESS FOR MICROBIAL 6β-HYDROXYLATION OF STEROIDS CONTAINING AROMATIC A-RINGS
Allen I. Laskin, Somerset, and Josef Fried, Princeton, N.J., assignors to Olin Mathieson Chemical Corporation, New York, N.Y., a corporation of Virginia
No Drawing. Filed Apr. 19, 1962, Ser. No. 188,898
3 Claims. (Cl. 195—51)

This invention relates to and has for its objects the provision of an improved process for the hydroxylation of steroids containing an aromatic A-ring and of certain new steroids produced thereby.

It is well known that steroidal ketones possessing either a saturated or partially unsaturated A-ring are readily attacked by a large variety of microorganisms with the formation of a wide variety of chemical entities. In contrast, reports concerning the microbiological transformation of steroids possessing an aromatic A-ring, such as estrone and estradiol, have been scant. It has now been found that if a microorganism of the genus Mortierella is employed, steroids possessing an aromatic A-ring are hydroxylated, thereby yielding a 6β-hydroxyl derivative. Moreover, if the steroids possess a 17-keto group, the keto is simultaneously reduced to a 17-hydroxyl group.

In its broadest aspects, therefore, the process of this invention entails subjecting a steroid containing an aromatic A-ring to the action of enzymes of a microorganism of the genus Mortierella and recovering the product formed. More narrowly, the process of this invention is directed to the subjecting of estrone or estradiol to the action of the enzymes of a microorganism of the genus Mortierella under oxidizing conditions and recovering the steroid formed. The oxidation is preferably effected by either including the steroid in an aerobic culture of the microorganism, or by bringing together in an aqueous medium the steroid, air and enzymes of non-proliferating cells of the microorganism.

In general, the conditions for culturing the Mortierella for the purposes of this invention are (except for the inclusion of the steroid to be converted) the same as those for culturing various microorganisms for the production of antibiotics and/or vitamin $B_{12}$, i.e., the microorganism is aerobically grown in contact with a suitable fermentation medium. A suitable medium essentially comprises a source of nitrogen and a source of carbon and energy. The latter may be a carbohydrate (such as sucrose, molasses, glucose, maltose, starch or dextrin), a fatty acid, a fat and/or the steroid itself. Preferably, however, the medium includes an assimilable source of carbon and energy in addition to the steroid.

The source of nitrogenous factors may be organic (e.g., soybean meal, corn steep liquor, meat extract and/or distillers' solubles) or synthetic (i.e., composed of simple, synthesizable organic or inorganic compounds).

An adequate, sterile air supply should be maintained during the fermentation, for example by the conventional methods of exposing a large surface of the medium to air, or by utilizing submerged aerated cultures. The steroid may be added to the culture during the incubation period, or included in the medium prior to sterilization or inoculation. The culture period may vary considerably, the range of about 6 to 96 hours being feasible, but not limiting.

Among the species of Mortierella which may be utilized the process of this invention can be mentioned *Mortierella alpina, M. acuminata, M. atrogrisea, M. bainieri, M. candelabrum, M. dichotoma, M. elasson, M. elongata, M. gemmifera, M. gracilis, M. horticola, M. humilis, M. hydrophila, M. isabellina, M. longicollis, M. marburgensis, M. minutissima, M. monospora, M. mutabilis, M. nana, M. parvispora, M. polycephala, M. pulchella, M. pusilla, M. raphani, M. renispora, M. reticulata, M. sepidonioides, M. spinosa, M. stylospora, M. van tieghemi, M. tuberosa, M. verticillata, M. vinacea, M. zonata,* and *M. zychae.*

Among the steroids which may be hydroxylated in accordance with the process of this invention are those steroids containing an aromatic A-ring. Particularly preferred are the steroids of the estrane series, as exemplified by estrone, estradiol, equilin, 9(11)-dehydroestrone and 8-dehydroestrone. In addition to these steroids, steroids possessing in addition an aromatic B-ring, such as equilenin, and steroids already having additional hydroxyl groups, such as 16α- and 16β-hydroxy estrone, may also be employed.

The process of this invention yields a 6β-hydroxy steroid derivative. If estrone or estradiol is employed as the starting steroid, 6β-hydroxyestradiol is obtained as the product.

The following examples are illustrative of the invention (all temperatures being in centigrade):

EXAMPLE 1

6β-Hydroxyestradiol

Surface growth from a three-week old agar slant cultures of *Mortierella alpina*, ATCC 8979 (American Type Culture Collection, Washington, D.C.), the slant containing as a nutrient medium (A): glucose, 10 g.; Difco yeast extract, 2.5 g.; $K_2HPO_4$, 1 g.; agar, 20 g.; and distilled water to 1 l., is suspended in 2.5 ml. of an 0.01% sodium lauryl sulfate aqueous solution. One milliliter portions of the suspension are used to inoculate two 250 ml. conical flasks, each containing 50 ml. of the following sterilized nutrient medium (B): dextrose, 10 g.; corn-steep liquor, 6 g.; $NH_4H_2PO_4$, 3 g.; Difco yeast extract, 2.5 g.; $CaCl_3$, 2.5 g.; and distilled water to 1 l. After 48 hours of incubation at 25° with continuous rotary agitation (280 cycles per minute, 2 inch radius), 10% (vol./vol.) transfers are made to twelve 250 ml. conical flasks each containing 50 ml. of fresh sterilized medium B. These are incubated under the conditions described above for 48 hours, after which another 10% (vol./vol.) transfer is made to one hundred additional 250 ml. flasks each containing 50 ml. of fresh sterilized medium B. The estrone is added by adding to each flask 0.25 ml. of a sterile solution of the steroid in N,N-dimethylformamide (100 mg./ml.) so that the medium is supplemented with 500 μg./ml. of steroid. After five days of further incubation, the contents of the flasks are pooled and filtered through a Seitz clarifying pad. The flasks, mycelium and pad are washed with successive 50 ml. portions of warm water. The combined filtrate and washings has a volume of 6,000 ml.

The combined filtrate and washings are extracted with three 2 l. portions of methyl isobutyl ketone. The combined extracts are washed with water and evaporated to dryness in vacuo. The resulting oily material (3.5 g.), is dissolved in benzene (100 ml.) and chromatographed on 60 g. of neutral alumina. The column is washed successively with 400 ml. portions of benzene-ethyl acetate (1:1) and ethyl acetate and these eluates are discarded. Subsequent elution with methanol produces 600 mg. of dark brown non-crystalline material which contains the desired 6β-hydroxyestradiol. For further purification it is dissolved in 50 ml. of ethyl acetate and chromatographed on 24 g. of neutral alumina. Elution with ethyl acetate (800 ml.) produces mainly non-polar material which is discarded. Elution with ethyl acetate-acetone 3:1 200 ml., 1:1 200 ml. acetone 1 l. and finally with methanol 200 ml. furnishes amorphous material which consists essentially of 6β-hydroxyestradiol as shown by paper chromatography. The fractions are combined and acetylated with 2 ml. of dry pyridine and 2 ml. of acetic anhydride. Evaporation of the reagents leaves a crystalline residue which after several recrystallizations from ether-hexane furnishes about 40 mg. of pure 6β-hydroxyestradiol triacetate, M.P. 173–175°; $[\alpha]_D^{23}$ +57° (c., .45 in chlf.).

*Analysis.*—Calcd. for $C_{23}H_{30}O_6$ (414.48): C, 69.54; H, 7.30. Found: C, 69.61; H, 7.23.

The infrared spectrum of this substance is identical with that of an authentic sample of 6β-hydroxyestradiol triacetate.

EXAMPLE 2

Following the procedure of Example 1, but substituting an equivalent amount of estradiol for the estrone, the same product, 6β-hydroxyestradiol is obtained.

Similarly, following the procedures of Examples 1 and 2 but substituting one of the other species of Mortierella mentioned before for the *Mortierella alpina* the same product, 6β-hydroxyestradiol is obtained.

The invention may be variously otherwise embodied within the scope of the appended claims.

What is claimed is:

1. A process for 6β-hydroxylating a steroid of the estrane series containing an aromatic A-ring, which comprises subjecting such steroid to the enzymes of a microorganism of the genus Mortierella.

2. A process for 6β-hydroxylating a steroid, which comprises subjecting a steroid selected from the group consisting of estrone and estradiol to the action of enzymes of an microorganism of the genus Mortierella under oxidizing conditions.

3. The process of claim 2 wherein the microorganism is *Mortierella alpina*.

References Cited in the file of this patent
UNITED STATES PATENTS

| | | |
|---|---|---|
| 2,602,769 | Murray et al. | July 8, 1952 |
| 2,962,423 | Feldman et al. | Nov. 29, 1960 |